United States Patent
Inagawa et al.

(10) Patent No.: US 9,365,205 B2
(45) Date of Patent: Jun. 14, 2016

(54) HYDRAULIC PRESSURE CONTROL DEVICE FOR TRANSMISSION

(75) Inventors: Tomokazu Inagawa, Susono (JP); Kenta Kimura, Susono (JP); Takafumi Inagaki, Susono (JP); Yuji Hattori, Gotemba (JP); Yu Nagasato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 64 days.

(21) Appl. No.: 14/346,557

(22) PCT Filed: Sep. 29, 2011

(86) PCT No.: PCT/JP2011/072377
§ 371 (c)(1),
(2), (4) Date: Mar. 21, 2014

(87) PCT Pub. No.: WO2013/046393
PCT Pub. Date: Apr. 4, 2013

(65) Prior Publication Data
US 2014/0228172 A1    Aug. 14, 2014

(51) Int. Cl.
*B60W 10/11* (2012.01)
*B60W 10/06* (2006.01)
(Continued)

(52) U.S. Cl.
CPC .............. *B60W 10/11* (2013.01); *B60W 10/02* (2013.01); *B60W 10/04* (2013.01); *B60W 10/06* (2013.01);
(Continued)

(58) Field of Classification Search
CPC ..... B60W 10/06; B60W 10/11; B60W 10/30; B60W 10/107; B60W 30/18018; B60W 2510/1075; B60W 2710/1083; Y10T 477/6237; Y10T 477/624; Y10T 477/6242; Y10T 477/688
See application file for complete search history.

(56) References Cited

U.S. PATENT DOCUMENTS

| | | | |
|---|---|---|---|
| 2005/0090365 A1* | 4/2005 | Tamai et al. | 477/5 |
| 2007/0243074 A1* | 10/2007 | Murakami et al. | 417/213 |
| 2010/0210413 A1* | 8/2010 | Yokokawa et al. | 477/40 |

FOREIGN PATENT DOCUMENTS

| | | |
|---|---|---|
| JP | 2003-14099 | 1/2003 |
| JP | 2004-76625 | 3/2004 |

(Continued)

OTHER PUBLICATIONS

International Search Report issued Nov. 1, 2011, in PCT/JP11/072377 filed Sep. 29, 2011.

*Primary Examiner* — Huan Le
(74) *Attorney, Agent, or Firm* — Oblon, McClelland, Maier & Neustadt, L.L.P

(57) ABSTRACT

A hydraulic pressure control device for a transmission, which operates a hydraulic apparatus by hydraulic pressure generated by an pump driven during operation of a driving force source, for which automatic stop control is performed, accumulates the hydraulic pressure in a pressure accumulator, and supplies the hydraulic pressure accumulated in the pressure accumulator to the hydraulic apparatus when the driving force source is automatically stopped is provided. The automatic stop control includes control to stop the driving force source when the vehicle speed is equal to or higher than a prescribed vehicle speed; and the hydraulic pressure control device performs a control to control an accumulated oil amount in the pressure accumulator and the automatic stop control in a manner to increase the accumulated oil amount of the pressure accumulator when the driving force source is automatically stopped.

8 Claims, 10 Drawing Sheets

(51) Int. Cl.
*B60W 10/02* (2006.01)
*B60W 10/107* (2012.01)
*B60W 10/30* (2006.01)
*B60W 30/18* (2012.01)
*B60W 10/04* (2006.01)
*F16H 61/00* (2006.01)

(52) U.S. Cl.
CPC ............ *B60W 10/107* (2013.01); *B60W 10/30* (2013.01); *B60W 30/18018* (2013.01); *F16H 61/0021* (2013.01); *B60W 2510/1075* (2013.01); *B60W 2520/10* (2013.01); *B60W 2710/1083* (2013.01); *B60Y 2300/18083* (2013.01); *F16H 2061/0034* (2013.01); *Y02T 10/48* (2013.01); *Y10T 477/688* (2015.01)

(56) References Cited

FOREIGN PATENT DOCUMENTS

| | | |
|---|---|---|
| JP | 2010-84658 | 4/2010 |
| JP | 2010-151238 | 7/2010 |
| JP | 2011-132993 | 7/2011 |
| WO | WO 2010/021218 A1 | 2/2010 |
| WO | WO 2010/107049 A1 | 9/2010 |

\* cited by examiner

HYDRAULIC PRESSURE CONTROL DEVICE FOR TRANSMISSION

TECHNICAL FIELD

The present invention relates to a hydraulic pressure control device for a transmission for a vehicle and particularly to a hydraulic pressure control device including a pressure accumulator.

BACKGROUND ART

An automatic transmission for a vehicle that controls a gear ratio on the basis of a vehicle speed, an accelerator operation amount (i.e. request drive amount), and the like is configured to set or change operational states such as a transmission path of torque and a transmission torque capacity by hydraulic pressure. For example, a stepped transmission is configured to engage or disengage a clutch or a brake by the hydraulic pressure to set a prescribed gear ratio and set the transmission torque capacity according to the hydraulic pressure. Further, a continuously variable transmission of a belt-type, a toroidal-type, or the like is configured to generate squeezing force on a transmission member such as a belt or a power roller by the hydraulic pressure to secure a prescribed transmission torque capacity and engage or disengage the clutch or the brake to perform switch between a forward travel state and a reverse travel state. In addition, a transmission has been known which is configured such that a gear pair is provided for each gear ratio, the gear pair that is involved in the torque transmission is selected from the gear pairs to set a prescribed gear ratio, the selection of the gear pair is performed by a hydraulic actuator, and input of torque to the gear pairs is performed via the clutch that is engaged by the hydraulic pressure.

An example of a belt-type continuously variable transmission and its hydraulic pressure control device among such kinds of transmissions is disclosed in WO 2010/21218. In the belt-type continuously variable transmission, a primary pulley and a secondary pulley on which a belt is wound are configured with a fixed sheave and a movable sheave so as to be capable of changing a groove width of a belt-winding groove, and a supply valve and a discharge valve that are configured with solenoid valves are connected to a hydraulic pressure chamber in each of the pulleys to change the gear ratio by supplying hydraulic pressure of a hydraulic pressure source to the hydraulic pressure chamber or to set a belt squeezing force to pressure according to the request drive amount. Further, the belt-type continuously variable transmission disclosed in WO 2010/21218 is installed in a vehicle that is configured to stop an engine when the vehicle stops and to restart the engine when the vehicle restarts traveling. Accordingly, because a mechanical type oil pump that is driven by the engine stops when the vehicle stops and does not generate the hydraulic pressure, the continuously variable transmission is provided with an accumulator and an electric oil pump that is driven by a motor to generate the hydraulic pressure. In addition, when the gear ratio or the squeezing force is maintained constant, the continuously variable transmission is configured to perform so-called zero-leakage control in which each valve is closed to shut in the hydraulic pressure. Accordingly, a valve such as a poppet valve that causes little leakage of the hydraulic pressure in a valve-closed state is employed as each valve.

Incidentally, because there have been demands for an improvement in fuel efficiency of the vehicle and reduction in exhaust gasses, so-called stop and start control (hereinafter referred to as S&S control) has recently been performed in which the engine is stopped when the vehicle stops or a prescribed condition is satisfied. When the S&S control is performed in the vehicle in which the transmission that is configured to obtain the hydraulic pressure by driving the oil pump by the engine is installed, the transmission can be controlled by the hydraulic pressure accumulated in the accumulator. Therefore, it is considered that no particular trouble occurs in a restart of travel and travel of the vehicle.

However, because the control of the transmission is performed along with supply and discharge of the hydraulic pressure and a hydraulic device has inevitable leakage of the hydraulic pressure, the hydraulic pressure gradually decreases when only the accumulator is used as the hydraulic pressure source. When the hydraulic pressure of the accumulator decreases to a predetermined reference pressure while the S&S control is performed, the engine is restarted to secure the hydraulic pressure. Thus, there is a case where the hydraulic pressure accumulated in the accumulator is low when the engine is stopped by the S&S control. In such a case, the engine is restarted due to the decrease in the hydraulic pressure in the accumulator, and a stop period of the engine may thus become short.

SUMMARY OF THE INVENTION

The present invention has been made in consideration of above technical problems, and an object thereof is to provide a hydraulic pressure control device for a transmission that can restrict shortening of a period in which a driving force source is automatically stopped due to a decrease in hydraulic pressure in a pressure accumulator.

To achieve the above object, the present invention provides a hydraulic pressure control device for a transmission, the hydraulic pressure control device configured to operate a prescribed hydraulic apparatus by hydraulic pressure generated by an oil pump to be driven during operation of a driving force source, for which automatic stop control is performed according to at least one of a vehicle speed and a request drive amount, to accumulate the hydraulic pressure in a pressure accumulator, and to supply the hydraulic pressure accumulated in the pressure accumulator to the hydraulic apparatus when the driving force source is automatically stopped, wherein the automatic stop control includes control to stop the driving force source during travel in which the vehicle speed is equal to or higher than a prescribed vehicle speed, and wherein the hydraulic pressure control device is configured to perform a pressure accumulation control to control an accumulated oil amount in the pressure accumulator and the automatic stop control in a cooperative manner so as to increase the accumulated oil amount of the pressure accumulator when the driving force source is automatically stopped during travel.

In the present invention, the driving force source may include an engine in which supply of fuel is stopped during deceleration and the supply of fuel is restarted when a prescribed condition is satisfied, and the hydraulic pressure control device may be configured to use the hydraulic pressure generated by the oil pump to be driven by the engine as at least a portion of the hydraulic pressure for operating the hydraulic apparatus at a time at which the supply of fuel is restarted, and subsequently perform stop control of the engine.

In such a configuration, the hydraulic pressure control device may be configured to operate the hydraulic apparatus only by the hydraulic pressure generated by the oil pump to be driven by the engine in a period after the supply of fuel is restarted until the stop control of the engine is performed.

Further, in the present invention, the driving force source may include an engine for which the automatic stop control is performed when the request drive amount during travel decreases to a prescribed value or smaller, and the hydraulic pressure control device may be configured to stop the supply of fuel to the engine at a time at which the request drive amount during travel becomes equal to or smaller than the prescribed value, accumulate the hydraulic pressure generated by the oil pump to be rotated together with the engine by traveling in the pressure accumulator, and subsequently perform the automatic stop control of the engine.

In the present invention, the automatic stop of the engine may be performed under a condition that the accumulated oil amount in the pressure accumulator is increased.

In addition, in the present invention, the condition that the accumulated oil amount in the pressure accumulator is increased may include pressure accumulation in the pressure accumulator to a full state.

Therefore, according to the hydraulic pressure control device of the present invention, even when the driving force source is automatically stopped during travel, the pressure accumulation control to accumulate the hydraulic pressure in the pressure accumulator and the automatic stop control are performed in a cooperative manner, and the accumulated oil amount in the pressure accumulator is increased. As a result, because a sufficient amount of pressure accumulation in the pressure accumulator is performed before the driving force source stops and the oil pump stops generating the hydraulic pressure, a time in which the hydraulic pressure in the pressure accumulator is used to control the transmission into a prescribed state during travel or after the vehicle stops, in other words, a time in which the driving force source is kept automatically stopped can be made longer.

Further, in the present invention, when the engine is restarted from the automatic stop and thereafter the engine is further automatically stopped, the hydraulic pressure that is generated by the oil pump that is driven by the engine after the restart is used to control the hydraulic apparatus. Alternatively, the hydraulic apparatus is controlled by using only the hydraulic pressure that is generated by the oil pump. Therefore, according to the present invention, when the engine is automatically stopped after the engine is restarted, the use of the hydraulic pressure that is accumulated in the pressure accumulator immediately before the restart is restricted, or the hydraulic pressure is not used. Accordingly, a decrease in the accumulated oil amount in the pressure accumulator is restricted, and the stop period can be made longer when the engine is automatically stopped after the restart.

According to the present invention, when the request drive amount becomes equal to or smaller than a prescribed value, for example, the accelerator operation amount becomes zero during travel, the automatic stop control of the engine is performed even if the vehicle is not stopped. However, because the hydraulic pressure is accumulated in the pressure accumulator before the automatic stop control is performed, a time in which the engine is thereafter automatically stopped can be made longer.

In addition, in the present invention, the automatic stop of the engine is performed under the condition that the accumulated oil amount in the pressure accumulator is increased or that the pressure accumulator becomes full. Accordingly, the accumulated oil amount in a time when the oil pump stops together with the engine can be made larger, and along with that shortening of the stop period of the engine due to the hydraulic pressure of the pressure accumulator can be prevented or restricted.

MODES FOR CARRYING OUT THE INVENTION

Figure 9:
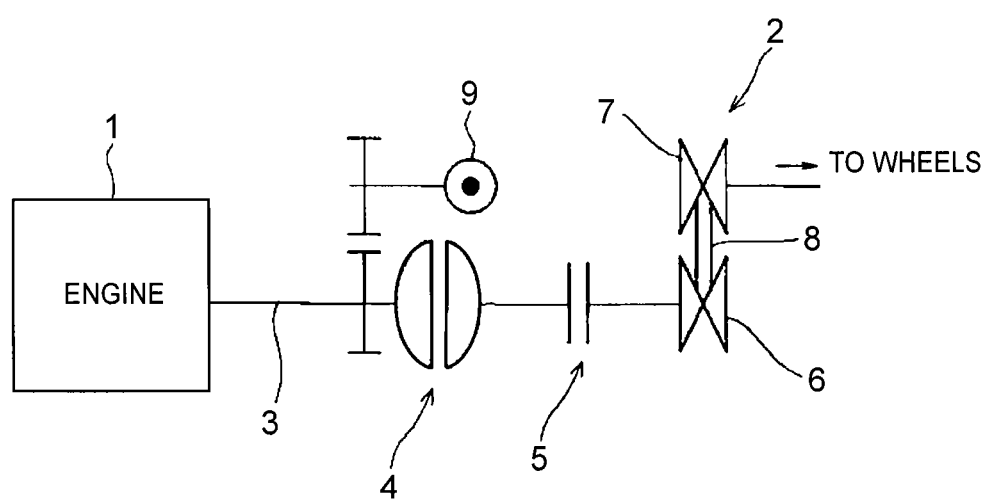
FIG. 9 is a block diagram that schematically illustrates an example of a power train of a vehicle to which the present invention can be applied.

A transmission to which the present invention is applied is a transmission that is installed in a vehicle to control a revolution speed of a driving force source or control driving torque, whose gear ratio is set or changed and transmission torque capacity is set by hydraulic pressure. Accordingly, the transmission to which the present invention is applied may be known transmissions such as a stepped automatic transmission, a belt-type or toroidal-type continuously variable transmission, and a dual-clutch type automatic transmission that switches gear trains that take part in torque transmission by two clutches. Further, the driving force source may be a known driving force source for a vehicle and may be any of an internal combustion engine such as a gasoline engine or a diesel engine, a motor, a hybrid drive device that combines the internal combustion engine and the motor, and the like. FIG. 9 schematically illustrates an example of a power train that uses an internal combustion engine (engine) 1 as a driving force source and a belt-type continuously variable transmission 2 as a transmission, and a torque converter (or a torque converter with a lock-up clutch) 4 is coupled to an output shaft of the engine 1. An input pulley 6 in the continuously variable transmission 2 is coupled to an element on an output side of the torque converter 4 via a clutch 5. The clutch 5 may be a forward travel clutch in a forward-reverse switching mechanism (not shown).

The continuously variable transmission 2 is configured such that a belt 8 is wound on the input pulley 6 and an output pulley 7, a groove width of the pulleys 6, 7 is made wider or narrower, a winding radius of the belt 8 with respect to each of the pulley 6, 7 is thereby made smaller or larger to set a prescribed gear ratio, and the gear ratio is changed. In other words, each of the pulleys 6, 7 is configured with a fixed sheave that is integral with a rotational shaft and a movable sheave that moves on the rotational shaft in an axial direction to approach or separate from the fixed sheave and includes a hydraulic pressure chamber (or a hydraulic actuator) that supplies the hydraulic pressure to press the movable sheave toward the fixed sheave. Accordingly, the groove width is changed by the hydraulic pressure (or an amount of hydraulic oil) that is supplied to the pulley 6 (or the pulley 7) that is one of the pulleys, a belt squeezing force is set by the hydraulic pressure that is supplied to the other pulley 7 (or the pulley 6), and the transmission torque capacity according to the hydraulic pressure is thereby obtained. The torque is transmitted from the output pulley 7 to an unillustrated drive shaft. The clutch 5, the hydraulic pressure chamber of each of the pulleys 6, 7, or the hydraulic actuator corresponds to a hydraulic apparatus in the present invention.

In addition, an oil pump 9 is coupled to the output shaft 3 of the engine 1 so as to be capable of transmitting the torque. The oil pump 9 is a mechanical type oil pump (mechanical pump) that includes two output ports, for example, and is configured to be driven by power transmitted from the engine 1 to generate the hydraulic pressure.

Figure 10:
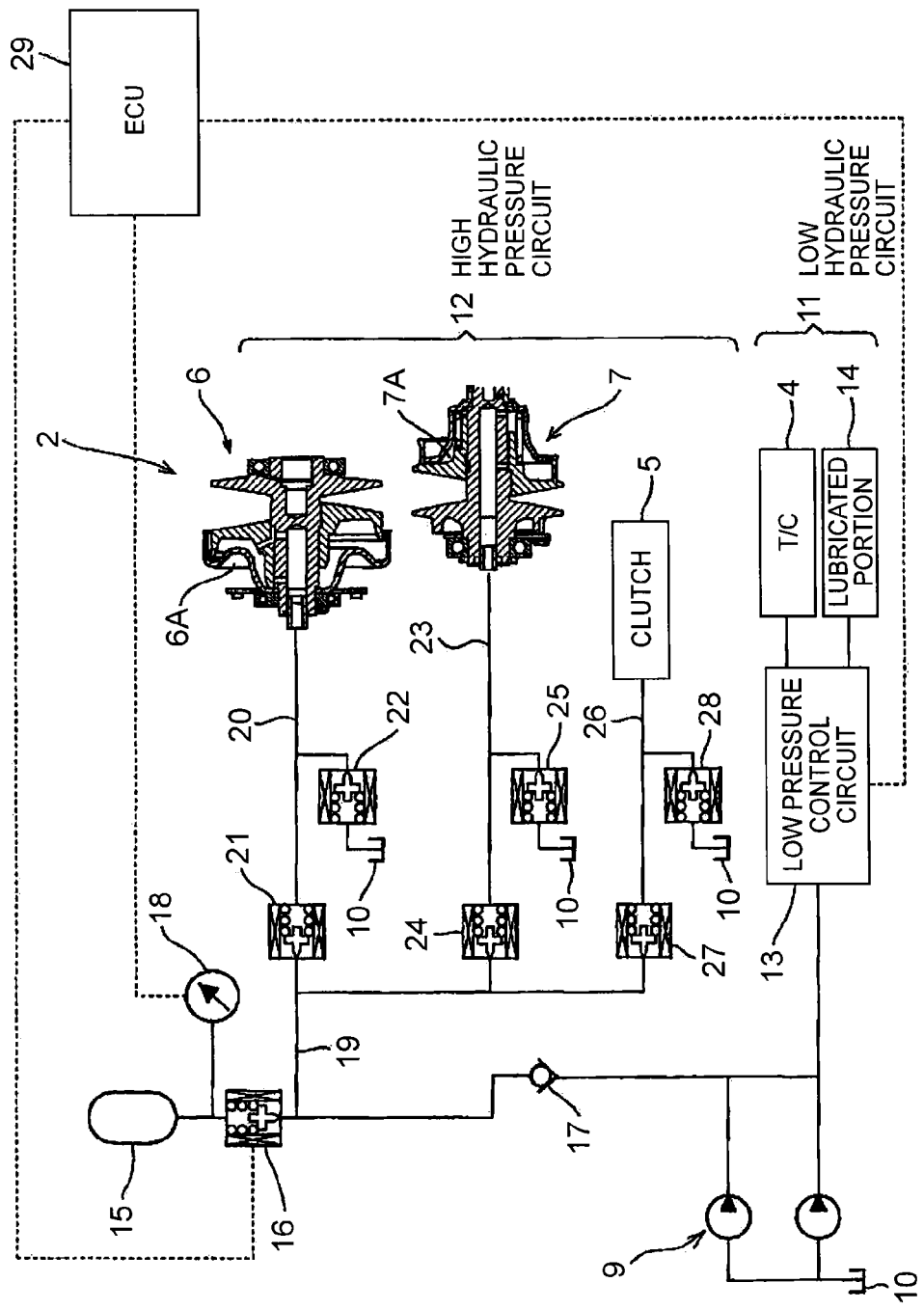
FIG. 10 is a hydraulic pressure circuit diagram showing an example of a hydraulic pressure circuit in a belt-type continuously variable transmission to which the present invention can be applied.

The hydraulic pressure control device in accordance with the present invention to be applied to the above-described transmission is configured such that a supply solenoid valve and a depressurization solenoid valve are provided for each of a hydraulic pressure chamber 6A in the input pulley 6 and a hydraulic pressure chamber 7A in the output pulley 7, the supply solenoid valve and the depressurization solenoid valve are provided for the above-described clutch 5, these solenoid valves are electrically controlled to open or close to control the gear ratio and the transmission torque capacity. Such an example is schematically illustrated in FIG. 10. The hydraulic pressure control device shown there is configured to pump up oil from an oil pan 10 by the oil pump 9 that is driven by the engine 1, discharge the oil, and supply the hydraulic pressure that is generated by the oil pump 9 to a low hydraulic pressure circuit 11 and a high hydraulic pressure circuit 12. The low hydraulic pressure circuit 11 is a hydraulic pressure circuit to which low hydraulic pressure (for example, drain hydraulic pressure) that is generated along with adjustment of hydraulic pressure discharged by the oil pump 9 to the hydraulic pressure that is required in the high hydraulic pressure circuit 12 by a low hydraulic pressure control circuit 13, and the above-described torque converter 4, a lubricated portion 14 in each section in the continuously variable transmission 2, and the like are included in the low hydraulic pressure circuit 11.

An accumulator 15 that corresponds to a pressure accumulator in the present invention is connected to a discharge opening of the oil pump 9. The accumulator 15 serves as a hydraulic pressure source for controlling the gear ratio and the belt squeezing force of the continuously variable transmission 2 or engagement-disengagement of the clutch 5, and a pressure accumulation control valve 16 that is electrically controlled to open or close is connected to an inlet-outlet opening of the accumulator 15. Further, a check valve 17 that inhibits a flow of the hydraulic pressure toward the discharge opening of the oil pump 9 is provided between the pressure accumulation control valve 16 and the discharge opening of the oil pump 9. Accordingly, the above-described low hydraulic pressure circuit 11 and the high hydraulic pressure circuit 12 that functions with high pressure such as the continuously variable transmission 2 are separated by the check valve 17. Further, a hydraulic pressure sensor 18 that detects the hydraulic pressure of the accumulator 15 and outputs a detection signal is provided.

The hydraulic pressure is supplied from an oil passage 19 that is branched between the pressure accumulation control valve 16 and the check valve 17 to the continuously variable transmission 2 and the clutch 5. More specifically, a supply solenoid valve 21 is provided in an oil passage 20 from the oil passage 19 to the hydraulic pressure chamber 6A of the input pulley 6, and supply of hydraulic oil to the hydraulic pressure chamber 6A in the input pulley 6 is selectively performed by opening or closing the oil passage 20 by the supply solenoid valve 21. Further, the hydraulic pressure chamber 6A in the input pulley 6 communicates with a depressurization solenoid valve 22 that discharges the hydraulic pressure of the hydraulic pressure chamber 6A to a drain portion such as the oil pan 10. In the example shown in FIG. 10, the depressurization solenoid valve 22 is connected to the oil passage 20 between the supply solenoid valve 21 and the hydraulic pressure chamber 6A.

The supply solenoid valve 21 and the depressurization solenoid valve 22 are valves that are electrically controlled to open or close ports and are configured to close the ports while causing little leakage of the hydraulic pressure in an unenergized state (off state). This configuration is made in order to shut in the hydraulic pressure in the hydraulic pressure chamber 6A to secure prescribed gear ratio and transmission torque capacity even when energization is stopped.

A supply-discharge mechanism of the hydraulic pressure for the hydraulic pressure chamber 7A in the output pulley 7 that sets the belt squeezing force is configured in the same manner as the supply-discharge mechanism of the hydraulic pressure for the hydraulic pressure chamber 6A in the input pulley 6. In other words, a supply solenoid valve 24 is provided in an oil passage 23 from the oil passage 19 to the hydraulic pressure chamber 7A of the output pulley 7, and supply of the hydraulic pressure to the hydraulic pressure chamber 7A in the output pulley 7 is selectively performed by opening or closing the oil passage 23 by the supply solenoid valve 24. Further, the hydraulic pressure chamber 7A in the output pulley 7 communicates with a depressurization solenoid valve 25 that discharges the hydraulic pressure of the hydraulic pressure chamber 7A to the drain portion such as the oil pan 10. In the example shown in FIG. 10, the depressurization solenoid valve 25 is connected to the oil passage 23 between the supply solenoid valve 24 and the hydraulic pressure chamber 7A.

The supply solenoid valve 24 and the depressurization solenoid valve 25 are valves that are electrically controlled to open or close ports and are configured to close the ports while causing little leakage of the hydraulic pressure in the unenergized state (off state). This configuration is made in order to shut in the hydraulic pressure in the hydraulic pressure chamber 7A to secure prescribed gear ratio and transmission torque capacity even when energization is stopped.

Further, a supply solenoid valve 27 is provided in an oil passage 26 from the oil passage 19 to the clutch 5, and supply of the hydraulic pressure to the hydraulic pressure chamber in the clutch 5 is selectively performed by opening or closing the oil passage 26 by the supply solenoid valve 27. Moreover, a depressurization solenoid valve 28 is connected to the hydraulic pressure chamber of the clutch 5. The depressurization solenoid valve 28 is configured to be electrically controlled to perform depressurization from the clutch 5 to the drain portion or the like, and the supply solenoid valves 27, 28 are configured to close ports while causing little leakage of the hydraulic pressure in the unenergized state (off state). This configuration is made in order to engage the clutch 5 to secure a prescribed transmission torque capacity even when energization is stopped. Each of the solenoid valves 16, 21, 22, 24, 25, 26, 27, 28, the low hydraulic pressure control circuit 13, and the like that are shown in FIG. 10 are configured to be controlled by an electronic control unit (ECU) 29, and the hydraulic pressure sensor 18 is configured to input the detection signal to the electronic control unit 29.

In the above-described hydraulic pressure control device, when the engine 1 operates for travel of the vehicle or the like, the oil pump 9 is driven by power of the engine to discharge the hydraulic pressure. The discharged pressure is adjusted to appropriate line pressure by a low hydraulic pressure control circuit 13. The drain hydraulic pressure generated along with the adjustment of pressure is supplied to the torque converter 4 and the lubricated portion 14.

Meanwhile, the check valve 17 is opened to supply the line pressure when the line pressure becomes higher than the hydraulic pressure of the circuit on a high pressure side such as the oil passage 19. Control of the gear ratio and the squeezing force of the continuously variable transmission 2 or the engagement-disengagement of the clutch 5 is performed by the hydraulic pressure that is supplied as described above. For example, when upshifting is performed, the supply solenoid valve 21 for the input pulley 6 is opened to supply the hydraulic pressure to the hydraulic pressure chamber 6A, the groove width of the input pulley 6 is thereby made wider. As a result, the winding radius of a belt 8 with respect to the input pulley 6 is increased, and the winding radius of the belt 8 with respect to the output pulley 7 is decreased, resulting in reduction in the rear ratio. On the other hand, when the hydraulic pressure chamber 6A of the input pulley 6 is depressurized by opening a depressurization solenoid valve 22, the winding radius of the belt 8 with respect to the input pulley 6 is decreased, and the winding radius of the belt 8 with respect to the output pulley 7 is increased, resulting in an increase in the gear ratio.

Further, when the supply solenoid valve 24 for the output pulley 7 is opened to supply the hydraulic pressure to the hydraulic pressure chamber 7A of the output pulley 7, the squeezing force on the belt 8 increases, and the transmission torque capacity of the continuously variable transmission 2 then increases. In contrast, when the depressurization solenoid valve 25 for the output pulley 7 is opened to depressurize the hydraulic pressure chamber 7A of the output pulley 7, the squeezing force on the belt 8 decreases, and the transmission torque capacity of the continuously variable transmission 2 then decreases. In addition, the supply solenoid valve 27 for the clutch 5 is opened to supply the hydraulic pressure to the clutch 5, the clutch 5 is engaged, and a forward travel state is then set. Such control in the high hydraulic pressure circuit 12 is performed by the hydraulic pressure of the accumulator 15 when the hydraulic pressure of the accumulator is sufficiently high or when accumulated oil amount is sufficiently large.

According to the hydraulic pressure control device, the accumulator 15 functions as the hydraulic pressure source even when the engine 1 is stopped and the oil pump 9 generates no hydraulic pressure. Accordingly, the vehicle in which the transmission and a hydraulic pressure control circuit are installed can perform hydraulic pressure control of the transmission even when the engine 1 is automatically stopped during travel. Automatic stop control of the engine 1 is namely control in which the engine 1 is automatically stopped independently from an operation by a driver because the engine 1 is not necessarily driven to maintain a travel or stop state of the vehicle and the engine 1 is immediately restarted when a request for increasing the driving force is made and that is referred to as stop and start control (S&S control). The S&S control enables three kinds of control described below. One of those kinds is control that is referred to as stop S&S control. This is control to automatically stop the engine 1 when the vehicle stops. The second kind is control that is referred to as deceleration S&S control. This is control to automatically stop the engine 1 in a low vehicle speed state immediately before stopping when the vehicle decelerates for stopping. Next, the third kind is control that is referred to as free-run S&S control, which is control to automatically stop the engine 1 when an accelerator operation amount (i.e. request drive amount) becomes zero or decreases to approximately zero (accelerator off state) in a state where the vehicle travels at a relatively high vehicle speed.

When the engine 1 is automatically stopped by the S&S control, the hydraulic pressure control device in accordance with the present invention is configured to perform pressure accumulation control in cooperation with the S&S control during travel in which the vehicle speed is equal to or higher than a prescribed vehicle speed. The control to perform the S&S control and the pressure accumulation control in a cooperation manner is namely control in which the accumulated oil amount of the accumulator 15 is increased as much as possible when the engine 1 is stopped and as a result the oil pump 9 stops generating the hydraulic pressure. An example of the control will be described below.

Figure 1:
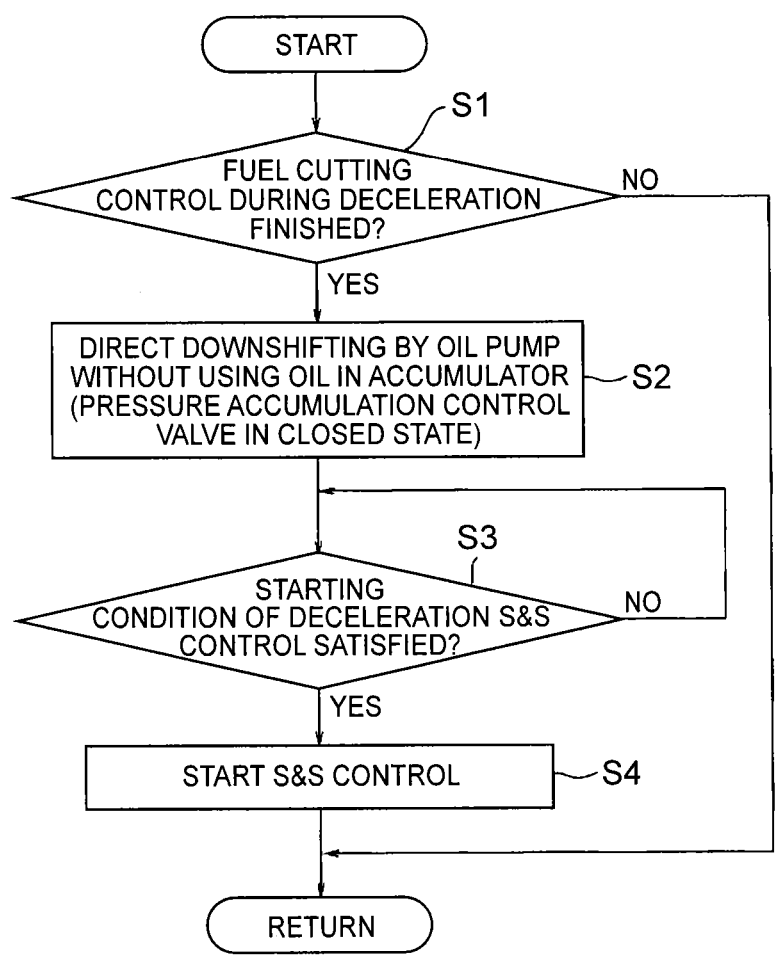
FIG. 1 is a flowchart for illustrating an example of control performed by a hydraulic pressure control device in accordance with the present invention.

FIG. 1 is a flowchart for illustrating an example of the pressure accumulation control that is performed in cooperation with the so-called stop S&S control in a state where the vehicle is still traveling during deceleration. This process is repeatedly performed in each prescribed short period in a state where a main switch (not shown) of the vehicle is turned on, for example. In the example of the control shown in FIG. 1, a determination is first made whether or not fuel cutting control is finished (step S1). The fuel cutting control is control in which supply of fuel to the engine 1 is stopped when an execution condition, for example, that the accelerator operation amount becomes zero is satisfied in a state where the vehicle speed is equal to or higher than a prescribed value and thus an engine revolution speed is equal to or higher than a prescribed returning revolution speed. Accordingly, when the engine revolution speed decreases to the returning revolution speed, the fuel cutting control is finished, and the supply of fuel to the engine 1 is restarted. During the fuel cutting control, pressure accumulation in the accumulator 15 is performed, and the accumulated oil amount in the accumulator 15 becomes full unless a specific circumstance occurs. This is for collecting inertial energy of the vehicle as much as possible.

Thus, if a negative determination is made in step S1 because the fuel cutting control is not finished, this routine is temporarily finished without performing particular control. On the other hand, if an affirmative determination is made in step S1 because the fuel cutting control is finished, downshifting for changing the gear ratio to a maximum gear ratio for a start of travel is directly controlled by the hydraulic pressure discharged by the oil pump 9 without using the hydraulic pressure of the accumulator (step S2). In other words, at a time point at which the fuel cutting control is finished, because the vehicle is still traveling and the gear ratio is increased for the start of travel after the vehicle stops, the hydraulic pressure is required for shift control. In the example of the control shown in FIG. 1, because the supply of fuel is restarted, the engine is in a driving state, and along with that the oil pump 9 generates the hydraulic pressure, the downshifting which continues after the fuel cutting control is performed by using the hydraulic pressure that is generated by the oil pump 9. Accordingly, the accumulated oil amount in the accumulator 15 is maintained full. Specifically, this control is performed by maintaining the above-described pressure accumulation control valve 16 in a closed state.

When the fuel cutting control is finished due to a decrease in the engine revolution speed along with a decrease in the vehicle speed, an S&S control (deceleration S&S control) starting condition is satisfied in a process of executing the control of step S2 or after the control. In other words, the vehicle speed decreases for stopping the vehicle, and the vehicle speed decreases to a predetermined reference vehicle speed or lower. A determination is then made whether or not the starting condition of the deceleration S&S control is satisfied following step S2 shown in FIG. 1 (step S3). For example, a determination is made whether or not the vehicle speed decreases to a prescribed value or lower in the accelerator off state. If a negative determination is made in step S3 because the starting condition of the deceleration S&S control is not satisfied, the process goes back to immediately previous step S2 or temporarily returns. On the other hand, if an affirmative determination is made in step S3 because the starting condition of the deceleration S&S control is satisfied, the deceleration S&S control is started (step S4). In other words, the engine 1 is automatically stopped according to a procedure after the starting condition of the S&S control is satisfied.

Figure 2:
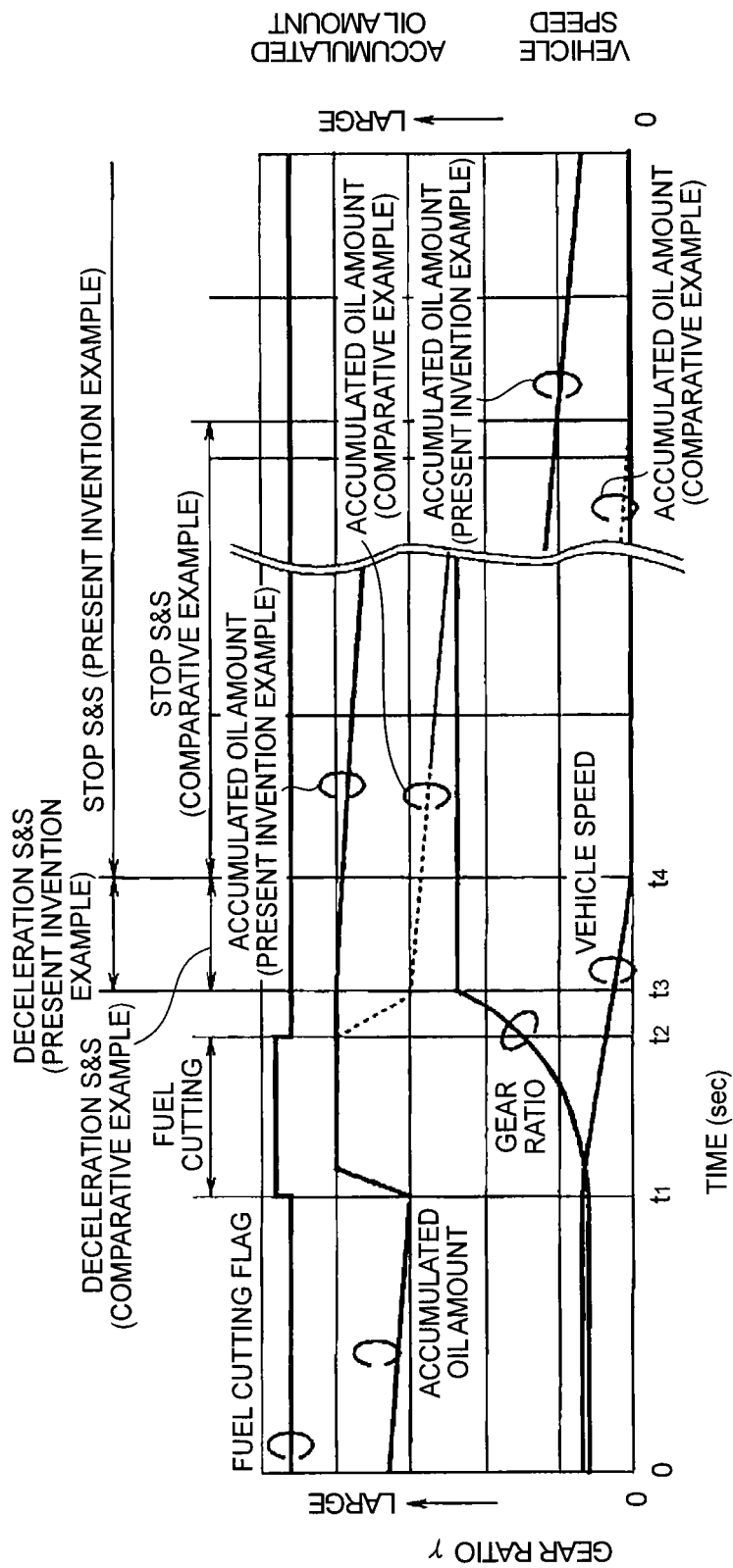
FIG. 2 is a time chart that schematically illustrates changes in an accumulated oil amount in a case where the control shown in FIG. 1 is performed and in the accumulated oil amount in a comparative example.

An example of a change in the accumulated oil amount in a case where the control shown in FIG. 1 is performed is shown by a time chart in FIG. 2. In a state where the vehicle travels at prescribed gear ratio γ and vehicle speed, the accumulated oil amount gradually decreases due to control of the continuously variable transmission 2 by using the hydraulic pressure or a portion thereof of the accumulator 15 or inevitable leakage. Further, because the fuel is supplied to the engine 1 due to pedaling on an accelerator pedal (not shown), the fuel cutting control is not performed, and its flag is turned off. When the accelerator pedal is returned (time point t1) in this state, the vehicle speed starts decreasing, and the gear ratio γ is gradually increased (downshifting is performed) to maintain the engine revolution speed. The fuel cutting control to stop the supply of fuel to the engine 1 is performed along with that. Thus, a fuel cutting flag is turned on. Further, in this case, the clutch 5 shown in FIG. 9, for example, is maintained in an engaged state, the engine 1 is forcibly made revolve by the inertial force of the vehicle, and the revolution speed is maintained at a relatively high revolution speed due to an increase in the gear ratio γ. Therefore, the oil pump 9 that is coupled to the engine 1 is driven to generate the hydraulic pressure, the hydraulic pressure is accumulated in the accumulator 15, and the accumulated oil amount increases.

When the engine revolution speed decreases to a fuel cutting returning revolution speed along with a decrease in the vehicle speed, the supply of fuel to the engine 1 is restarted. In other words, the fuel cutting control is finished, and its flag is again turned off (time point t2). The gear ratio γ is thereafter increased to the gear ratio for the start of travel, and the vehicle speed further decreases. In this process, the hydraulic pressure is required for increasing the gear ratio and maintaining the belt squeezing force. In the example of the control shown in FIG. 1, the hydraulic pressure that is generated by the oil pump 9 is used as the hydraulic pressure for that purpose. Accordingly, the accumulator 15 is maintained in a full state, and the accumulated oil amount becomes the maximum.

When the gear ratio γ is increased to the gear ratio for a restart of travel (time point t3), a so-called shut-in state of the hydraulic pressure is obtained, no hydraulic pressure is actively supplied to or discharged from the hydraulic pressure chambers 6A, 7A in the respective pulleys 6, 7. Then, the starting condition of the deceleration S&S control is satisfied at this time point t3, immediately before that, or immediately after that, the engine 1 is automatically stopped, and the oil pump 9 is stopped. Accordingly, although the accumulated oil amount in the accumulator 15 slightly decreases due to the inevitable leakage, an approximately full accumulated oil amount is maintained.

The vehicle stops in the process of execution of the deceleration S&S control as described above (time point t4). The stop S&S control is thereafter performed, and the engine 1 and the oil pump 9 are maintained in a stop state. Accordingly, the accumulated oil amount in the accumulator 15 gradually decreases by small portions due to the inevitable leakage or the like. However, because the accumulated oil amount is increased before the start of the S&S control, it takes long time for the accumulated oil amount to decrease to a lower limit accumulated oil amount that is required for control of the continuously variable transmission 2. During that time, the engine 1 can be kept stopped, and fuel efficiency can thus be improved. In contrast, as shown by broken lines in FIG. 2, the accumulated oil amount in the accumulator 15 decreases due to downshifting control in a comparative example where the hydraulic pressure of the accumulator 15 is used for the downshifting after the fuel cutting control is finished. Therefore, the accumulated oil amount in the accumulator 15 has already become small at a time point at which the deceleration S&S control is started, in other words, a time point at which the oil pump 9 stops. Thus, the accumulated oil amount in the accumulator 15 decreases to an amount that is insufficient for the control of the continuously variable transmission 2 in an early stage, a time when the engine is restarted to drive the oil pump 9 is soon reached, resulting in a short stop period of the engine 1. Accordingly, fuel consumption increases, and an effect of fuel efficiency improvement is thus limited.

In the control shown in FIG. 1, the downshifting after the fuel cutting control is finished and until the gear ratio becomes the maximum may be made by partially using the hydraulic pressure accumulated in the accumulator 15 in addition to direct control by using only the hydraulic pressure that is generated by the oil pump 9. When control is made in such a manner, because a discharge amount requested by the oil pump 9 can be reduced for the portion from the hydraulic pressure of the accumulator 15, a load to the engine 1 or a fuel consumption amount for that can be reduced. Further, the control shown in FIG. 1 is effective for a vehicle in which a time after the fuel cutting control is finished and until the stop S&S control is started. For the vehicle in which the time is long, control shown in FIG. 5 or shown in FIG. 7 that will be described below may be performed.

In addition, an example of control will be described where the free-run S&S control and the pressure accumulation control are performed in a cooperation manner. The example of the control is shown by a flowchart in FIG. 3. A routine shown there is repeatedly performed in each prescribed short time in a state where the main switch (not shown) of the vehicle is turned on, for example, in the same manner as the routine shown in FIG. 1. In the example of the control shown in FIG. 3, a determination is first made whether or not a starting condition of the free-run S&S control is satisfied (step S11). As described above, the free-run control is control in which the engine 1 is automatically stopped in a state where it is considered that the engine 1 is not required to be driven, such as a state where the accelerator operation amount becomes zero while the vehicle speed is relatively high. Accordingly, the starting condition is that the vehicle speed is equal to or higher than a prescribed vehicle speed, the accelerator operation amount is equal to or smaller than a prescribed value, and the like. Thus, the determination in step S11 can be made on the basis of detection values that are obtained by sensors such as a vehicle speed sensor and an accelerator operation amount sensor.

Figure 3:
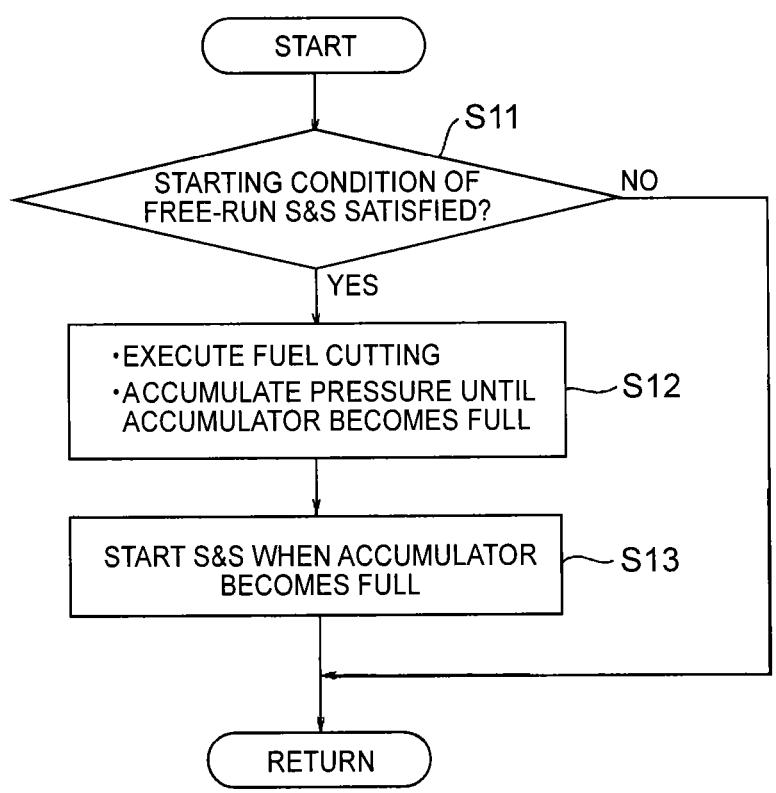
FIG. 3 is a flowchart for illustrating an example of cooperative control of free-run S&S control and pressure accumulation control that is performed by the hydraulic pressure control device in accordance with the present invention.

If a negative determination is made in step S11 because the starting condition of the free-run S&S control is not satisfied, the routine of FIG. 3 is temporarily finished without performing particular control. On the other hand, if an affirmative determination is made in step S11 because the starting condition of the free-run S&S control is satisfied, the free-run S&S control is not performed, but the fuel cutting control is performed. Further, the pressure accumulation control is performed so as to increase the accumulated oil amount in the accumulator 15 or make the accumulator 15 full (step S12). In other words, the fuel cutting control is control in which the supply of fuel to the engine 1 is stopped and the clutch shown in FIG. 9, for example, is engaged to forcibly make the engine 1 revolve by the inertial force of the vehicle. Therefore, the oil pump 9 is driven along with the engine 1 to generate the hydraulic pressure. In other words, a portion of the inertial energy of the vehicle is collected as the hydraulic pressure. In step S12, the hydraulic pressure is accumulated in the accumulator 15 to increase the accumulated oil amount.

When the accumulated oil amount increases to a predetermined prescribed amount or larger or when the accumulator 15 becomes full, the S&S control is started (step S13). Thus, the engine 1 is automatically stopped according to a procedure that is in advance determined as the free-run S&S control.

Figure 4:
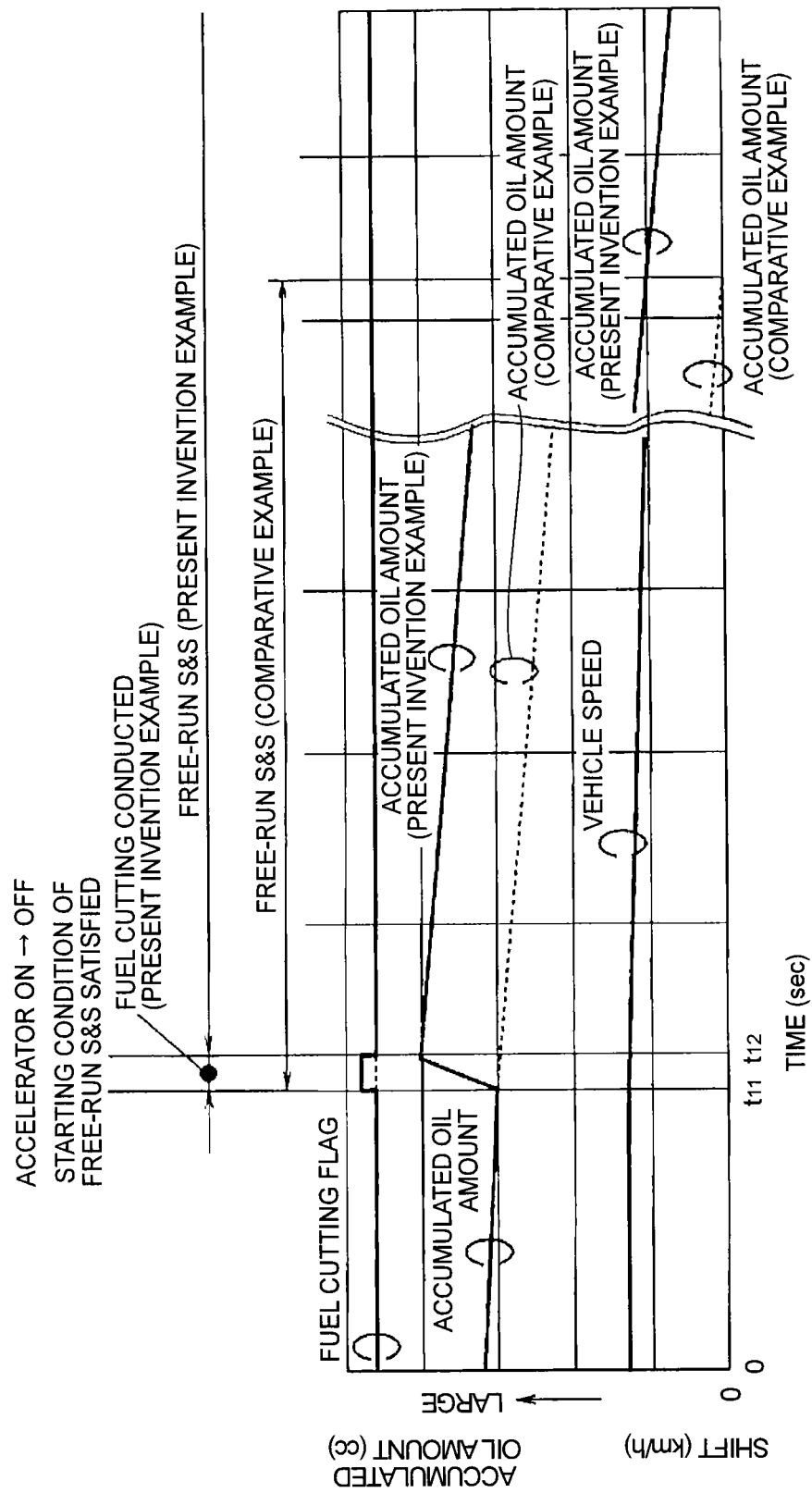
FIG. 4 is a time chart that schematically illustrates changes in the accumulated oil amount in a case where the control shown in FIG. 3 is performed and in the accumulated oil amount in the comparative example.

An example of a change in the accumulated oil amount in a case where the control shown in FIG. 3 is performed is shown by a time chart in FIG. 4. In a state where the vehicle travels at a certain vehicle speed or higher, the accumulated oil amount gradually decreases due to the control of the continuously variable transmission 2 by using the hydraulic pressure or a portion thereof of the accumulator 15 or the inevitable leakage. Further, because the fuel is supplied to the engine 1 due to pedaling on the accelerator pedal (not shown), the fuel cutting is not performed, and its flag is turned off. If the accelerator pedal is returned in this state (time point t11), the starting condition of the free-run S&S control is satisfied. However, the S&S control is not immediately performed, but the fuel cutting control is performed. In other words, the engine 1 and the continuously variable transmission 2 are coupled together while the clutch 5 shown in FIG. 9, for example, is maintained in the engaged state. The supply of fuel to the engine 1 is stopped in this state, and the engine 1 is forcibly made revolve by the inertial force of the vehicle. Because the oil pump 9 is driven along with that to generate the hydraulic pressure, the pressure accumulation control valve 16 is opened, the pressure is thereby accumulated in the accumulator 15, and the accumulated oil amount is increased.

When the accumulated oil amount increases to a prescribed value or larger (time point t12), for example, when the accumulator 15 becomes full as described above, the free-run S&S control is performed instead of the fuel cutting control. In other words, the engine 1 is automatically stopped. In this case, because the clutch 5 is disengaged, the oil pump 9 generates no hydraulic pressure because the engine 1 does not revolve. Accordingly, because the control of the continuously variable transmission 2 is performed by using the hydraulic pressure of the accumulator 15, the accumulated oil amount gradually decreases due to shifting, the inevitable leakage, or the like. However, because the accumulated oil amount is increased before the start of the free-run S&S control, it takes long time for the accumulated oil amount to decrease to the lower limit accumulated oil amount that is required for the control of the continuously variable transmission 2. During that time, the engine 1 can be kept stopped, and the fuel efficiency can thus be improved. In contrast, as shown by broken lines in FIG. 4, in a comparative example where the engine 1 is immediately stopped when the starting condition of the free-run S&S control is satisfied, the accumulated oil amount has already decreased at a time point at which the starting condition of the free-run S&S control is satisfied, and the engine 1 and the oil pump 9 that is coupled thereto stop in this state. Thus, the accumulated oil amount decreases to the amount that is insufficient for the control of the continuously variable transmission 2 in an early stage, and a time when the engine is restarted to drive the oil pump 9 is soon reached, resulting in the short stop period of the engine 1. Accordingly, the fuel consumption increases, and the effect of fuel efficiency improvement is thus limited.

Here, a description will be made about control in which the pressure accumulation is performed before automatic stop control of the engine 1 when the automatic stop control of the engine 1 is performed along with stop of the vehicle. The example of the control is shown by a flowchart in FIG. 5. A routine shown there is repeatedly performed in each prescribed short time in a state where the main switch (not shown) of the vehicle is turned on, for example, in the same manner as the routines shown in FIG. 1 and FIG. 3. In the example of the control shown in FIG. 5, a determination is first made whether or not the starting condition of the S&S control is satisfied (step S21). The starting condition is namely for determining a state where the engine 1 can be stopped independently from an operation of the driver, for example, that the vehicle speed is a low vehicle speed such as almost stopping the vehicle, the accelerator operation amount is a low operation amount close to zero, and the like. The condition can be predetermined in view of design of the vehicle. The vehicle speed and the accelerator operation amount (i.e. request drive amount) can be detected by the sensors such as the vehicle speed sensor and the accelerator operation amount sensor (none shown) that are installed in the vehicle.

Figure 5:
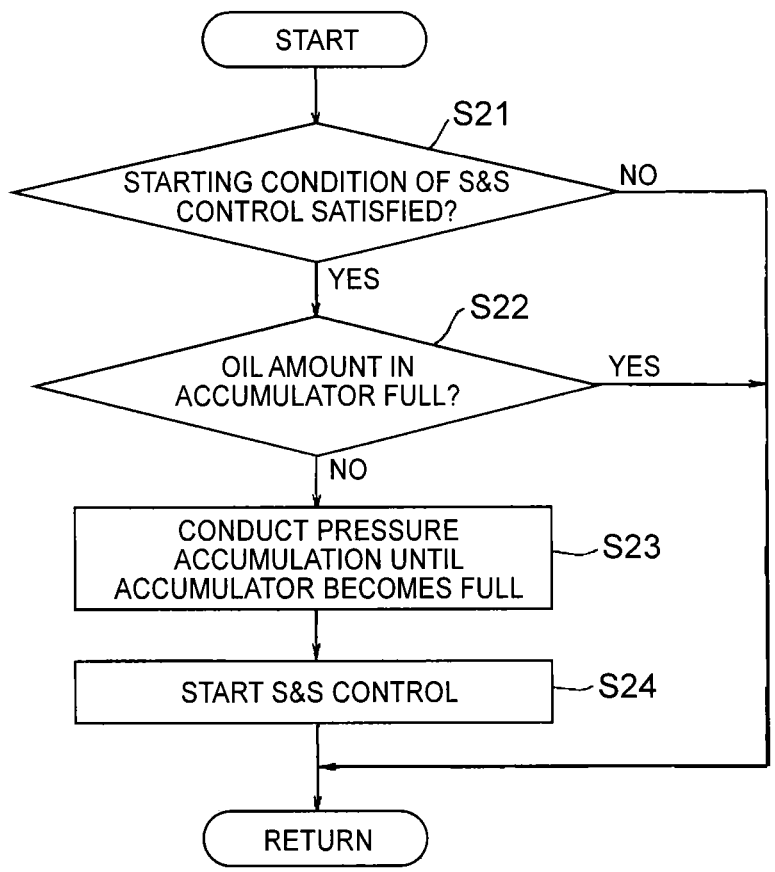
FIG. 5 is a flowchart for illustrating another example of the control performed by the hydraulic pressure control device in accordance with the present invention.

If a negative determination is made in step S21 because the starting condition of the S&S control is not satisfied, the routine of FIG. 5 is temporarily finished without performing particular control. On the other hand, if an affirmative determination is made in step S21 because the starting condition of the S&S control is satisfied, a determination is made whether or not an oil amount in the above-described accumulator 15 is full (step S22). This determination can be made on the basis of a detection value of the hydraulic pressure sensor 18 that communicates with the accumulator 15. For example, if the detection value is equal to or higher than a pressure when the accumulator 15 is full, a determination result in step S22 becomes affirmative. If an affirmative determination is made in step S22 because the oil amount in the accumulator 15 is full, because no further pressure accumulation can be performed, the routine of FIG. 5 is temporarily finished without performing particular control.

On the other hand, if a negative determination is made in step S22 because the accumulator 15 is not full, the pressure accumulation control is conducted until the accumulator 15 becomes full (step S23). In other words, the engine 1 is not automatically stopped although the starting condition of the S&S control is satisfied at this time point, the engine 1 operates, and the oil pump 9 discharges the hydraulic pressure. Thus, the discharge pressure or the line pressure is increased, and the above-described pressure accumulation control valve 16 is opened, thereby increasing the accumulated oil amount in the accumulator 15. When the pressure that is detected by the hydraulic pressure sensor 18 becomes a predetermined value and the accumulator 15 becomes full, the pressure accumulation control valve 16 is closed. The S&S control is thereafter started (step S24). In other words, the engine 1 is automatically stopped according to the procedure after the starting condition of the S&S control is satisfied. Consequently, according to the control shown in FIG. 5, at a time point at which the engine 1 stops and the oil pump 9 thus generates no hydraulic pressure, the accumulated oil amount in the accumulator 15 is increased to the maximum. In the present invention, it is sufficient that the accumulated oil amount is increased before the automatic stop of the engine 1. Although the accumulated oil amount is preferably increased to the full state, the full state is not necessarily required. The pressure accumulation control may be performed so as to make an increase so that the accumulated oil amount exceeds that at the time point at which the starting condition of the S&S control is satisfied.

Figure 6:
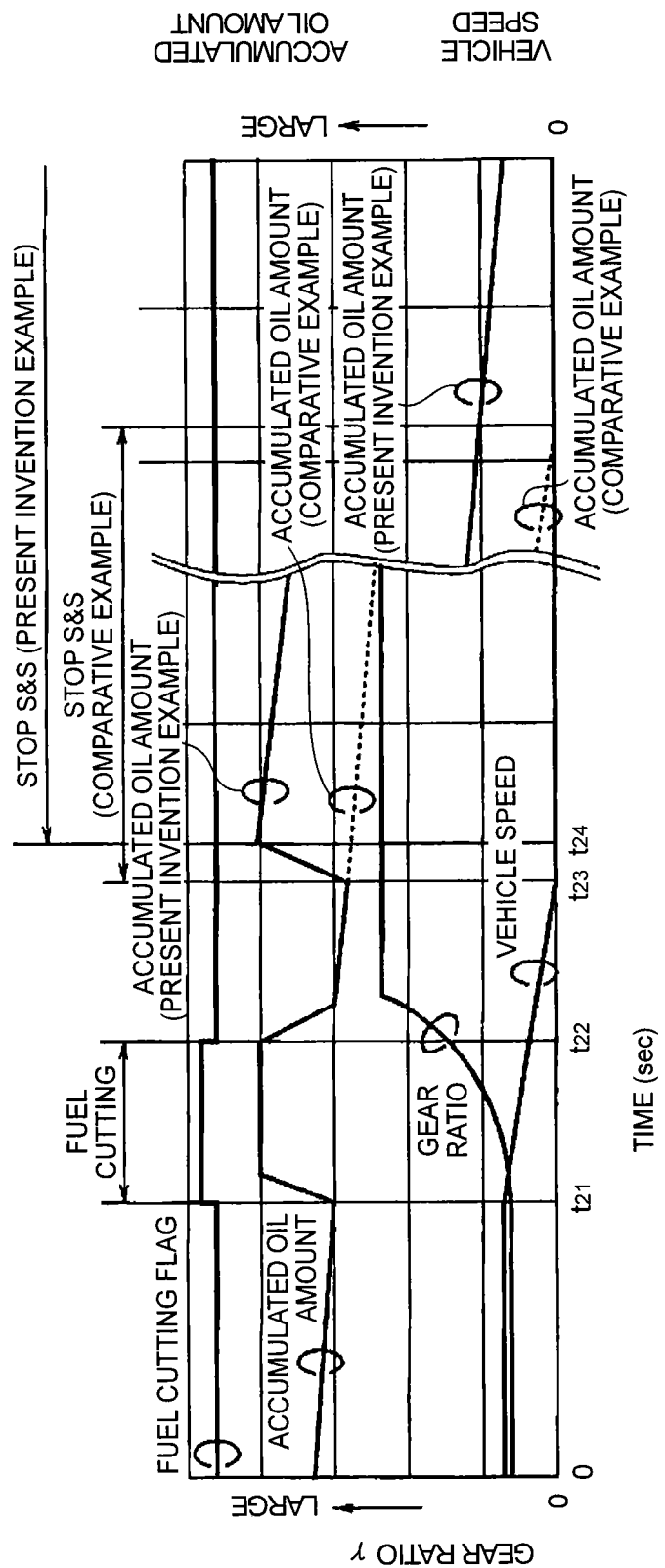
FIG. 6 is a time chart that schematically illustrates changes in the accumulated oil amount in a case where the control shown in FIG. 5 is performed and in the accumulated oil amount in the comparative example.

An example of a change in the accumulated oil amount in a case where the control shown in FIG. 5 is performed is shown by a time chart in FIG. 6. In a state where the vehicle travels at prescribed gear ratio γ and vehicle speed, the accumulated oil amount gradually decreases due to the control of the continuously variable transmission 2 by using the hydraulic pressure or a portion thereof of the accumulator 15 or the inevitable leakage. Further, because the fuel is supplied to the engine 1 due to pedaling on the accelerator pedal (not shown), the fuel cutting is not performed, and its flag is turned off. When the accelerator pedal is returned (time point t21) in this state, the vehicle speed starts decreasing, and the gear ratio γ is gradually increased to maintain the engine revolution speed. The fuel cutting control to stop the supply of fuel to the engine 1 is performed along with that. Thus, a fuel cutting flag is turned on. Further, in this case, the clutch 5 shown in FIG. 9, for example, is maintained in the engaged state, the engine 1 is forcibly made revolve by the inertial force of the vehicle, and the revolution speed is maintained at a relatively high revolution speed due to an increase in the gear ratio γ. Therefore, the oil pump 9 that is coupled to the engine 1 is driven to generate the hydraulic pressure, the hydraulic pressure is accumulated in the accumulator 15, and the accumulated oil amount increases.

When the engine revolution speed decreases to the fuel cutting returning revolution speed along with a decrease in the vehicle speed, the supply of fuel to the engine 1 is restarted. In other words, the fuel cutting control is finished, and its flag is again turned off (time point t22). The gear ratio γ is thereafter increased to the gear ratio for the start of travel, and the vehicle speed further decreases. In this process, because the hydraulic pressure of the accumulator 15 is used to increase the gear ratio and maintain the belt squeezing force, the accumulated oil amount decreases. When the gear ratio is increased to the gear ratio for the start of travel and maintained at the gear ratio, the change in the gear ratio stops, and a decreasing tendency of the accumulated oil amount is reduced.

Then, if a determination is made that the vehicle speed decreases to a prescribed value or low and the vehicle stops (time point t23), an affirmative determination is made in step S21 in FIG. 5. The pressure accumulation control is performed so as to increase the accumulated oil amount, more specifically, make the accumulator 15 full. Accordingly, in the hydraulic pressure control device in accordance with the present invention, even if the vehicle stops and the starting condition of the S&S control is satisfied, the engine 1 is not automatically stopped immediately. The engine 1 is kept driven, the oil pump 9 thereby generates the hydraulic pressure, and the hydraulic pressure is accumulated in the accumulator 15. When the accumulated oil amount increases and an almost full state of the accumulator 15 is detected (time point t24), the S&S control is performed to automatically stop the engine 1. In this case, the gear ratio is maintained at a prescribed gear ratio for the restart of travel of the vehicle. Specifically, the solenoid valves 21, 22, 24, 25 for the respective pulleys 6, 7 that are described above are closed, and the solenoid valves 27, 28 for the clutch 5 are closed. In other words, shut-in control of the hydraulic pressure (zero-leakage control) is performed. The shut-in control may not particularly be performed, but control may be made in which prescribed gear ratio and squeezing force are maintained by using the hydraulic pressure of the accumulator 15.

In a case where any of those kinds of control is performed, the accumulated oil amount gradually decreases by small portions due to leakage of the hydraulic pressure or the like. However, because sufficient pressure is accumulated in the accumulator 15, a state in which the accumulated oil amount is larger than the oil amount required for the control of the continuously variable transmission 2 can be maintained for a long time. A change in the accumulated oil amount in a case where the pressure accumulation control in accordance with the present invention is not performed (comparative example) is indicated by broken lines. In the comparative example, because the engine 1 is automatically stopped at the same time as the starting condition of the S&S control is satisfied at the above-described time point t23, the oil pump 9 stops while the decreased accumulated oil amount is kept. As a result, the accumulated oil amount largely decreases while the S&S control is started and the oil pump 9 is stopped. In other words, because the accumulated oil amount becomes insufficient in an early stage, the engine 1 is restarted due to the insufficient accumulated oil amount, and duration of the S&S control, in other words, a time in which the engine 1 stops becomes shorter than a case where the control of the present invention is performed, resulting in an increase in the fuel consumption amount. In other words, the effect of fuel efficiency improvement is reduced even if the S&S control is performed. However, according to the hydraulic pressure control device in accordance with the present invention, as shown in FIG. 6, the duration of S&S control becomes long and the effect of fuel efficiency improvement can be increased.

Another example of control will next be described where the stop S&S control and the pressure accumulation control are performed in a cooperation manner. The example of the control is shown by a flowchart in FIG. 7. A routine shown there is an example of a configuration in which the pressure accumulation control is performed while presuming or predicting execution of the stop S&S control and is repeatedly performed in each prescribed short time in a state where the main switch (not shown) of the vehicle is turned on, for example, in the same manner as the routines shown in FIG. 1, FIG. 3 or FIG. 5. In the example of the control shown in FIG. 7, a determination is first made whether or not the starting condition of the S&S control is soon satisfied (step S31). The determination can be made on the basis of the vehicle speed, a deceleration, the accelerator operation amount (i.e. request drive amount), presence or absence of braking, and the like. A reference of the determination can appropriately be determined in view of design on the basis of experiment or the like.

A negative determination is made in step S31 because of non-satisfaction of the starting condition of the S&S control due to acceleration or the like or a retained sufficiently high vehicle speed or the like in spite of deceleration, this routine is temporarily finished without performing particular control.

On the other hand, if an affirmative determination is made in step S31, a determination is made whether or not the accumulator 15 is full (step S32). This is the same determination as the above-described determination in step S22 shown in FIG. 5. Thus, a determination may be made whether or not the accumulated oil amount increases to a predetermined prescribed amount or larger instead of the determination whether or not the accumulator 15 is full. If a negative determination is made in step S32 because the accumulated oil amount in the accumulator 15 is small, the pressure accumulation control is conducted until the accumulator 15 becomes full (step S33). This control is the same as the above-described control in step S23 shown in FIG. 5. The discharge pressure of the oil pump 9 is increased, and the pressure accumulation control valve 16 is opened to increase the accumulated oil amount in the accumulator 15. Thereafter, the S&S control is performed and the engine 1 is automatically stopped at a time point at which the satisfaction of the starting condition of the S&S control that is presumed in step S31 is made (step S34). If a negative determination is made in step S32, in other words, if the accumulator 15 has already become full, the process immediately moves to step S34, and the S&S control is immediately performed along with the satisfaction of the starting condition of the S&S control.

Figure 7:
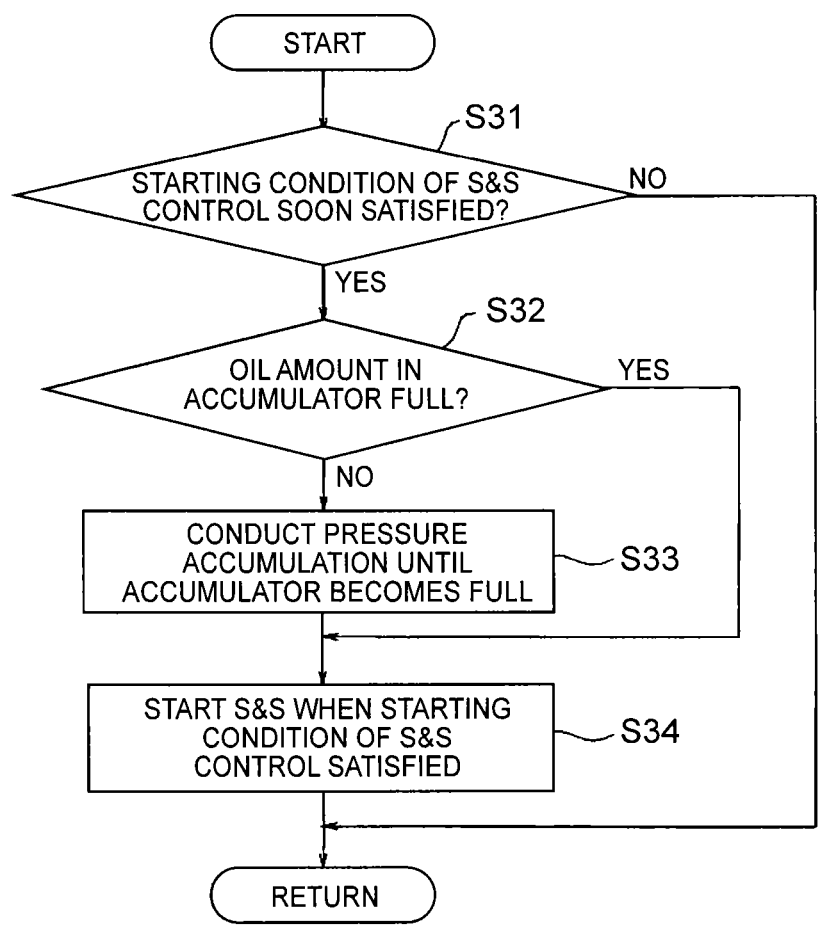
FIG. 7 is a flowchart for illustrating yet another example of the control performed by the hydraulic pressure control device in accordance with the present invention.
Figure 8:
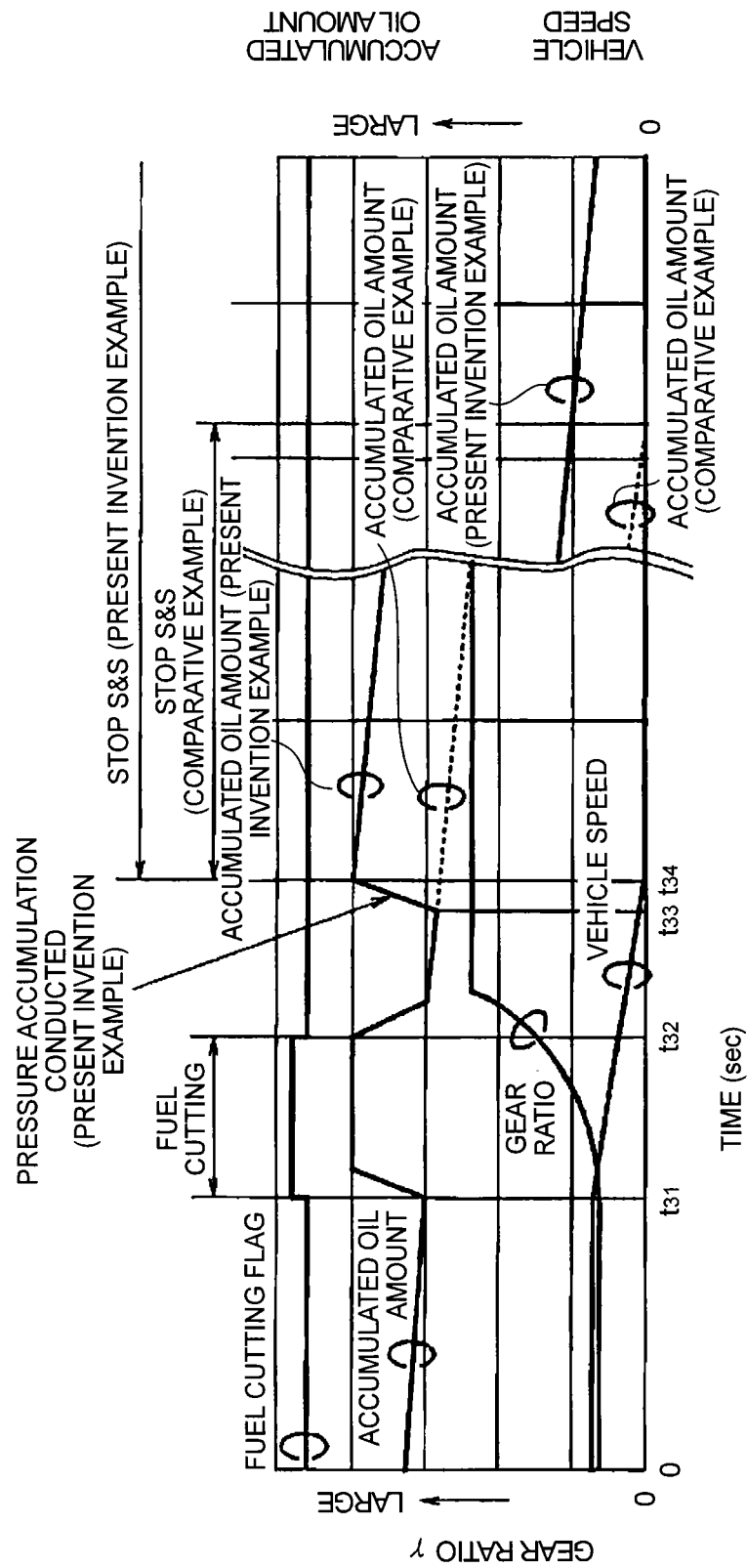
FIG. 8 is a time chart that schematically illustrates changes in the accumulated oil amount in a case where the control shown in FIG. 7 is performed and in the accumulated oil amount in the comparative example.

An example of a change in the accumulated oil amount in a case where the control shown in FIG. 7 is performed is shown by a time chart in FIG. 8. In a state where the vehicle travels at prescribed gear ratio γ and vehicle speed, the accumulated oil amount gradually decreases due to the control of the continuously variable transmission 2 by using the hydraulic pressure or a portion thereof of the accumulator 15 or the inevitable leakage. Further, because the fuel is supplied to the engine 1 due to pedaling on the accelerator pedal (not shown), the fuel cutting is not performed, and its flag is turned off. When the accelerator pedal is returned (time point t31) in this state, the vehicle speed starts decreasing, and the gear ratio γ is gradually increased to maintain the engine revolution speed. The fuel cutting control to stop the supply of fuel to the engine 1 is performed along with that. Thus, a fuel cutting flag is turned on. Further, in this case, the clutch 5 shown in FIG. 9, for example, is maintained in the engaged state, the engine 1 is forcibly made revolve by the inertial force of the vehicle, and the revolution speed is maintained at a relatively high revolution speed due to an increase in the gear ratio γ. Therefore, the oil pump 9 that is coupled to the engine 1 is driven to generate the hydraulic pressure, the hydraulic pressure is accumulated in the accumulator 15, and the accumulated oil amount increases.

When the engine revolution speed decreases to the fuel cutting returning revolution speed along with a decrease in the vehicle speed, the supply of fuel to the engine 1 is restarted. In other words, the fuel cutting control is finished, and its flag is again turned off (time point t32). The gear ratio γ is thereafter increased to the gear ratio for the start of travel, and the vehicle speed further decreases. In this process, because the hydraulic pressure of the accumulator 15 is used to increase the gear ratio and maintain the belt squeezing force, the accumulated oil amount decreases. When the gear ratio is increased to the gear ratio for the start of travel and maintained at the gear ratio, the change in the gear ratio stops, and the decreasing tendency of the accumulated oil amount is thereby reduced.

When the vehicle speed decreases as described above and the vehicle stops (time point t34), the starting condition of the S&S control is satisfied at the time point. The satisfaction of the starting condition of the S&S control is presumed on the basis of a change in the vehicle speed, the accelerator operation amount, and the like. Accordingly, a determination that the starting condition of the S&S control is satisfied at the time point t33 before the time point t34, and the control to increase the accumulated oil amount is performed on the basis of the determination result. Then, at the time point t34 at which the accumulated oil amount sufficiently increases, more specifically, after the accumulator 15 becomes full, the engine 1 is automatically stopped along with the satisfaction of the starting condition of the S&S control.

In this case, the gear ratio is maintained at a prescribed gear ratio for the restart of travel of the vehicle. Specifically, the solenoid valves 21, 22, 24, 25 for the respective pulleys 6, 7 that are described above are closed. In other words, the shut-in control of the hydraulic pressure (zero-leakage control) is performed. The shut-in control may not particularly be performed, but control may be made in which prescribed gear ratio and squeezing force are maintained by using the hydraulic pressure of the accumulator 15. The clutch 5 is controlled to obtain a disengaged state.

In a case where any of those kinds of control is performed, the accumulated oil amount gradually decreases by small portions due to leakage of the hydraulic pressure or the like. However, because sufficient pressure is accumulated in the accumulator 15, a state in which the accumulated oil amount is larger than the oil amount required for the control of the continuously variable transmission 2 can be maintained for a long time. A change in the accumulated oil amount in a case where the pressure accumulation control in accordance with the present invention is not performed (comparative example) is indicated by broken lines. In the comparative example, even if the starting condition of the S&S control is satisfied at the above-described time point t34, the pressure accumulation is not actively performed during a period around the time point t34. Therefore, the oil pump 9 stops while the decreased accumulated oil amount is kept. As a result, the accumulated oil amount largely decreases while the S&S control is started and the oil pump 9 is stopped. In other words, because the accumulated oil amount becomes insufficient in an early stage, the engine 1 is restarted due to the insufficient accumulated oil amount, and the duration of the S&S control, in other words, the time in which the engine 1 stops becomes shorter than a case where the control of the present invention is performed, resulting in an increase in the fuel consumption amount. In other words, the effect of fuel efficiency improvement is reduced even if the S&S control is performed. However, according to the hydraulic pressure control device in accordance with the present invention, as shown in FIG. 8, the duration of S&S control becomes long and the effect of fuel efficiency improvement can be increased.

In a case where a configuration is made so as to perform the control shown in FIG. 7, the pressure accumulation control that is performed before the starting condition of the S&S control is satisfied is preferably completed before the starting condition of the S&S control is satisfied. Therefore, the determination in step S31 is preferably performed so that a time from the time point t33 to the time point t34 becomes sufficiently longer than a time that is required for the pressure accumulation. Further, when the starting condition of the S&S control is satisfied in a process of performing the pressure accumulation in the accumulator 15, the S&S control may be performed and the engine 1 may be automatically stopped when the pressure accumulation control is finished in the same manner as the above-described example of the control shown in FIG. 5.

The above-described specific examples are to be applied to the hydraulic pressure control device in the transmission for the vehicle in which the engine 1 is installed as the driving force source. However, the present invention does not necessarily require the fuel cutting control and can thus be applied to the hydraulic pressure control device in a transmission for a vehicle in which a driving force source other than the internal combustion engine such as a motor is installed.

The invention claimed is:

1. A hydraulic pressure control device for a transmission, comprising:
   a pressure accumulator in which hydraulic pressure generated by an oil pump to be driven during operation of a driving force source, for which automatic stop control is performed according to at least one of a vehicle speed and a request drive amount; and
   a control unit configured to operate a prescribed hydraulic apparatus by the hydraulic pressure generated by the oil pump, to accumulate the hydraulic pressure in the pressure accumulator, and to supply the hydraulic pressure accumulated in the pressure accumulator to the hydraulic apparatus when the driving force source is automatically stopped, wherein:
   the driving force source includes an engine in which supply of fuel is stopped during deceleration and the supply of fuel is restarted when a prescribed condition is satisfied;
   the transmission includes a continuously variable transmission to be controlled by the hydraulic pressure such that a gear ratio is continuously increased when the vehicle speed decreases for stopping;
   the automatic stop control includes control to stop the engine during travel in which the vehicle speed is equal to or higher than a prescribed vehicle speed; and
   the control unit is configured to increase the gear ratio of the transmission by the hydraulic pressure generated by the oil pump to be driven by the engine at a time at which the supply of fuel to the engine, which is stopped during deceleration, is restarted based on satisfaction of the prescribed condition, and to subsequently perform the automatic stop control of the engine based on satisfaction of a condition for performing the automatic stop control.

2. The hydraulic pressure control device for the transmission according to claim 1, wherein, the control unit is configured to operate the hydraulic apparatus only by the hydraulic pressure generated by the oil pump to be driven by the engine in a period after the supply of fuel is restarted until the automatic stop control of the engine is performed.

3. The hydraulic pressure control device for the transmission according to claim 1, further comprising a pressure accumulation control valve that opens and closes an inlet-outlet opening of the pressure accumulator, wherein
   the control unit is configured to close the pressure accumulation control valve until the automatic stop control of the engine is performed after the supply of fuel is restarted.

4. The hydraulic pressure control device tor the transmission according to claim 1, wherein the automatic stop control of the engine is performed under a condition that an accumulated oil amount in the pressure accumulator is increased.

5. The hydraulic pressure control device for the transmission according to claim 4, wherein the condition that the accumulated oil amount in the pressure accumulator is increased includes pressure accumulation in the pressure accumulator to a full state.

6. A hydraulic pressure control device for a transmission, comprising:
   a pressure accumulator in which hydra pressure generated by an oil pump to be driven during operation of a driving force source, for which automatic stop control is performed according to at least one of a vehicle speed and a request drive amount; and
   a control unit configured to operate a prescribed hydraulic apparatus by the hydraulic pressure generated by the oil pump, to accumulate the hydraulic pressure in the pressure accumulator, and to supply the hydraulic pressure accumulated in the pressure accumulator to the hydraulic apparatus when the driving force source is automatically stopped, wherein:
   the driving force source includes an engine for which the automatic stop control is performed when the request drive amount during travel decreases to a prescribed value or smaller; and
   the control unit is configured to stop supply of fuel to the engine before the automatic stop control is performed, at a time at which the request drive amount during travel becomes equal to or smaller than the prescribed value, to accumulate the hydraulic pressure generated by the oil pump and the engine rotating together, which is rotated by a vehicle inertial force during travel, in the pressure accumulator, and to subsequently perform the automatic stop control of the engine.

7. The hydraulic pressure control device for the transmission according to claim 6, wherein the automatic stop control of the engine is performed under a condition that an accumulated oil amount in the pressure accumulator is increased.

8. The hydraulic pressure control device for the transmission according to claim 7, wherein the condition that the accumulated oil amount in the pressure accumulator is increased includes pressure accumulation in the pressure accumulator a full state.

* * * * *